US012710937B2

(12) United States Patent
Banhidai et al.

(10) Patent No.: US 12,710,937 B2
(45) Date of Patent: Aug. 18, 2026

(54) SYSTEM AND METHOD FOR ENABLING USER INTERFACE TEXT TRANSLATION

(71) Applicant: WARNERMEDIA DIRECT, LLC, New York, NY (US)

(72) Inventors: Csaba Banhidai, Budapest (HU); Janos Szilardi, Miami, FL (US)

(73) Assignee: WarnerMedia Direct, LLC, New York, NY (US)

( * ) Notice: Subject to any disclaimer, the term of this patent is extended or adjusted under 35 U.S.C. 154(b) by 315 days.

(21) Appl. No.: 18/532,015

(22) Filed: Dec. 7, 2023

(65) Prior Publication Data

US 2025/0190186 A1 Jun. 12, 2025

(51) Int. Cl.
*G06F 8/38* (2018.01)
*G06F 40/58* (2020.01)

(52) U.S. Cl.
CPC ................ *G06F 8/38* (2013.01); *G06F 40/58* (2020.01)

(58) Field of Classification Search
None
See application file for complete search history.

(56) References Cited

U.S. PATENT DOCUMENTS

| | | | | |
|---|---|---|---|---|
| 10,261,996 | B2 * | 4/2019 | Chen | G06F 40/58 |
| 11,854,669 | B1 * | 12/2023 | Bachand | H04L 9/0866 |
| 12,443,805 | B1 * | 10/2025 | Mortensen | G06F 40/58 |
| 2009/0125497 | A1 * | 5/2009 | Jiang | G06F 16/3337 |
| 2014/0122054 | A1 * | 5/2014 | Takano | G06F 9/454 704/2 |
| 2017/0147560 | A1 * | 5/2017 | Pearson | G06F 3/0481 |
| 2019/0034080 | A1 * | 1/2019 | Nagel | G06F 40/58 |
| 2020/0356635 | A1 * | 11/2020 | Szturo | G06F 8/71 |
| 2022/0012435 | A1 * | 1/2022 | Parrott | G06V 30/19 |
| 2022/0413997 | A1 * | 12/2022 | Shi | G06T 7/70 |
| 2023/0409842 | A1 * | 12/2023 | Ati | G06V 40/28 |

* cited by examiner

*Primary Examiner* — Toan H Vu
(74) *Attorney, Agent, or Firm* — Bookoff McAndrews, PLLC

(57) ABSTRACT

Systems, computing platforms, methods, and storage media for enabling user interface text translation are disclosed. Exemplary implementations may: obtain, from a design application, original text associated with a user interface element; generate a translation key based on the original text associated with the user interface element; send the translation key to a translation application; receive, from the translation application, a translation output associated with the translation key; and provide, to the design application, the translation output for use in creating a translated user interface element in the second language related to the user interface element in the first language.

20 Claims, 5 Drawing Sheets

SYSTEM AND METHOD FOR ENABLING USER INTERFACE TEXT TRANSLATION

FIELD

The present disclosure relates to user interface development, including but not limited to systems, computing platforms, methods, and storage media for enabling user interface text translation.

BACKGROUND

A user interface is an important aspect of user interaction with a software application. User interface design often includes contributions from different parties, including for example graphic designers, user interface designers, user experience (UX) designers and/or UX writers. An initial user interface design may include a plurality of user interface elements.

Typically, a user interface is initially designed with text for one language. As a user-base for a software application grows, there is a desire to provide the user interface in more than one language. Translation of text included as part of the user interface is typically performed manually. Even when there may be some automation of part of the translation, the incorporation of the translated text into the user interface is typically performed manually in a design application.

Improvements in approaches for enabling user interface text translation are desirable.

BRIEF DESCRIPTION OF THE DRAWINGS

Embodiments of the present disclosure will now be described, by way of example only, with reference to the attached Figures.

DETAILED DESCRIPTION

Figure 1:
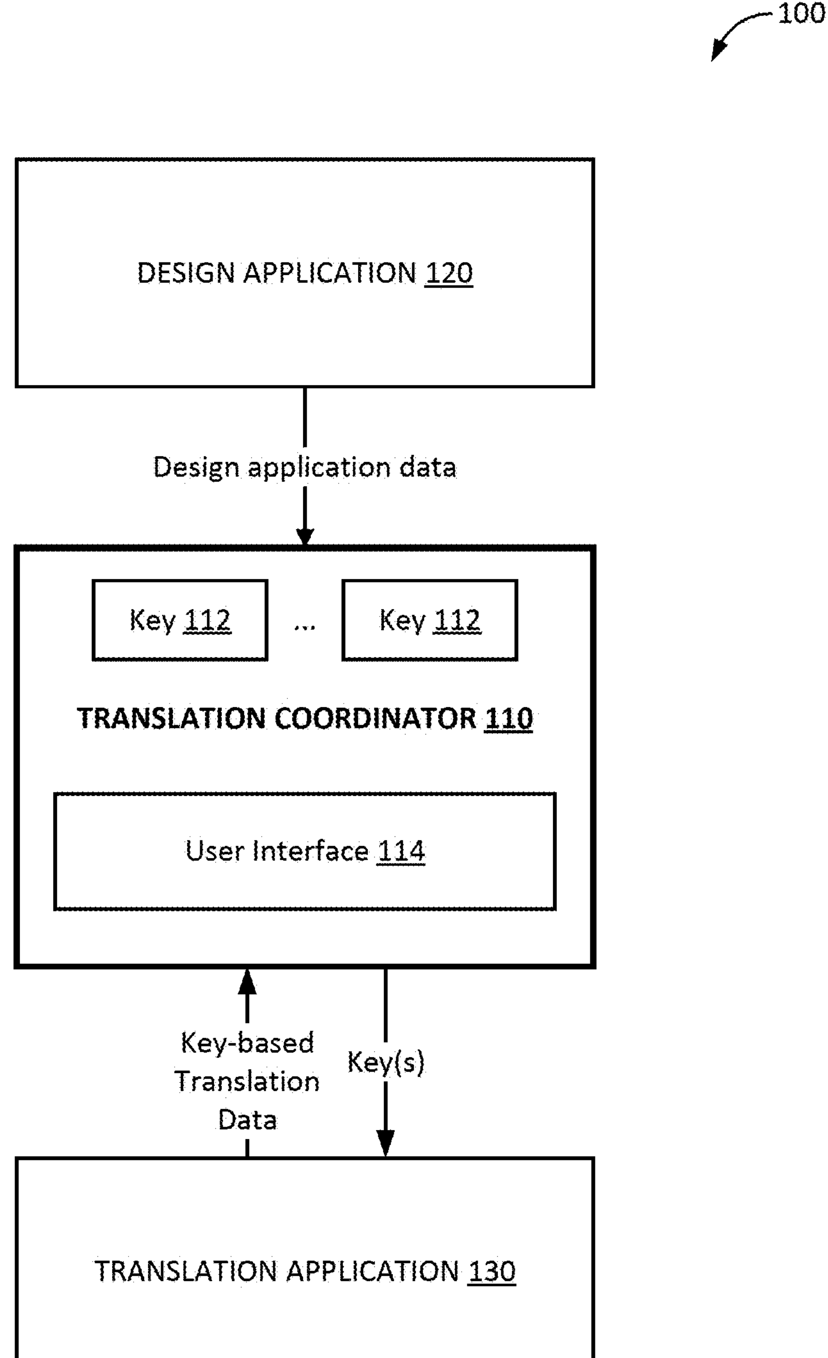
FIG. 1 illustrates a system configured for enabling user interface text translation, in accordance with one or more embodiments.

Systems, computing platforms, methods, and storage media for enabling user interface text translation are disclosed. Exemplary implementations may: obtain, from a design application, original text associated with a user interface element; generate a translation key based on the original text associated with the user interface element; send the translation key to a translation application; receive, from the translation application, a translation output associated with the translation key; and provide, to the design application, the translation output for use in creating a translated user interface element in the second language related to the user interface element in the first language.

In an embodiment, the present disclosure provides a system and method for coordinating translation of text included in a user interface. User interface development may be performed using a design application. According to known approaches, such a design application has no established way to communicate with a translation application. As a result, creation of user interface elements including translated text according to known approaches often involves copying and pasting text from the translation application to the design application.

A design application is a software tool that may be used by a user interface designer for designing a user interface (UI). While a design application can assist with generating some software code, the role of the design application is in the UI design, not in deploying the software being designed. There is a technical problem that a design application is not readily configured for supporting deployment of a UI, or deployment of software associated with the UI in different languages or formats associated with different regions or user groups. For example, a design application may include user interface elements having original text in a first language which will also see deployment in a plurality of other languages different from the originating language, thereby requiring translation into the different languages. Designers may choose to copy and paste the original language text into a translation application, then copy and paste the translated text back into the design application for a version of a UI being developed in another language.

There is a technical problem that a design application is not configured to be able to communicate with a translation application, for example for the purposes of translating text that is part of a user interface element. Existing approaches involve a user manually cutting and pasting data from the translation application to the design application, which is time consuming and introduces opportunity for manual errors. Even if the design application were configured to be able to somehow communicate with the translation application, there is currently no mechanism to ensure efficient communication to assist in user interface text translation.

Embodiments of the present disclosure provide a technical solution by providing a translation coordinator, which may be implemented as a plugin, to coordinate communication between a design application and a translation application, and to enable insertion of translated text into related design elements in the design application. For example, suppose a designer uses Figma™ to design a user interface including UI elements having original text. The translation coordinator may be implemented as a Figma™ plugin, and be configured to provide the original text and a translation key to a translation application, obtain translated text from the translation application and provide the translated text for insertion into one or more design elements in the design application that are associated with the translation key.

Association of the design element(s) with the translation key enables a technical solution of a processor-implemented method of coordinating insertion of the translated text into the design element(s) associated with the translation key, independent of human involvement that is involved with known approaches. This improves the functioning of the computer by generating a translation key and performing a computer-implemented method independent of human involvement, thereby increasing speed and efficiency and avoiding human errors. The translation key is generated by a processor, and provides an improvement in the functioning of a computer, for example by automatically associating original text with translated text in a translation output, to facilitate and automate creation of a translated user interface element including the translated text. Without generation of the translation key, approaches rely on copying and pasting text. Generation and transmission of the translation key, which may include the original text itself, may provide a technical improvement in the functioning of the computer by providing a single piece of data that provides the text to be translated as well as instructions associated with the translation, enabling more efficient execution of the translation with reduced processing and memory load. Embodiments of the present disclosure integrate the processor-implemented steps into a practical application including user interface design using a design application and a translation application, for example providing translated text for insertion into user interface elements in the design application that are associated with the translation key.

One aspect of the present disclosure relates to a system or computing platform configured for enabling user interface text translation. The system or computing platform may include a non-transient computer-readable storage medium having executable instructions embodied thereon. The system or computing platform may include one or more hardware processors configured to execute the instructions, for example as part of, or via, a translation coordinator in accordance with one or more embodiments. The processor(s) may execute the instructions to obtain, from a design application, original text associated with a user interface element. The original text may be in a first language. The processor(s) may execute the instructions to generate a translation key based on the original text associated with the user interface element. The processor(s) may execute the instructions to send the translation key to a translation application. The processor(s) may execute the instructions to receive, from the translation application, a translation output associated with the translation key. The translation output may include translated text in a second language corresponding to the original text in the first language. The processor(s) may execute the instructions to provide, to the design application, the translation output for use in creating a translated user interface element in the second language related to the user interface element in the first language.

Another aspect of the present disclosure relates to a method for enabling user interface text translation. The method may include obtaining, from a design application, original text associated with a user interface element. The original text may be in a first language. The method may include generating a translation key based on the original text associated with the user interface element. The method may include sending the translation key to a translation application. The method may include receiving, from the translation application, a translation output associated with the translation key. The translation output may include translated text in a second language corresponding to the original text in the first language. The method may include providing, to the design application, the translation output for use in creating a translated user interface element in the second language related to the user interface element in the first language.

Yet another aspect of the present disclosure relates to a non-transient computer-readable storage medium having instructions embodied thereon, the instructions being executable by one or more processors to perform a method for enabling user interface text translation. The method may include obtaining, from a design application, original text associated with a user interface element. The original text may be in a first language. The method may include generating a translation key based on the original text associated with the user interface element. The method may include sending the translation key to a translation application. The method may include receiving, from the translation application, a translation output associated with the translation key. The translation output may include translated text in a second language corresponding to the original text in the first language. The method may include providing, to the design application, the translation output for use in creating a translated user interface element in the second language related to the user interface element in the first language.

Another technical problem relates to use or wasting of processor and memory resources due to re-translation of the same original text. For example, suppose a user interface comprises a plurality of elements that include the same original text, such as Subscribe Now. According to known approaches, text is provided to a translation application for translation, and the output is inserted. However, if the translation application translates the same text 5 times for 10 different translation languages, and the text is repeated on 15 different screens, this results in unnecessary use of processor and memory resources in the translation itself, as well as the transmission and processing of the translated text. Embodiments of the present disclosure provide a technical solution by sending, along with a translation key, a common text indicator. The common text indicator may indicate a plurality of different user interface elements which include the same original text identified by the translation key. In this way, the common text indicator may be used in preventing duplicate translation of the original text for each of the plurality of different user interface elements. This solves a computing problem of excess use of processor and memory resources, which can be avoided by using a translation key according to one or more embodiments to avoid or prevent re-translation of the same original text, for example by leveraging translated text that has already been generated. Embodiments also provide improvements in processor efficiency, memory efficiency and reduce the use of translation and data transmission resources compared to known approaches that may re-translate instances of repeated or common text. This solves a computing problem by providing a solution that reduces the amount of text translation resources and data transmission resources required, while improving user experience and reducing resource costs associated with the translation and transmission of translated text. Such improvements and solutions to computer problems are also achieved by methods of one or more embodiments described and illustrated herein.

Consider an example scenario of user interface text translation from English to two (2) non-English languages. Using known approaches by manually copying and pasting data from a translation application to a design application, it would take 3 people about 5 days to complete a full user interface translation for only 2 languages. Such known approaches also require human intervention and skill. Using a system and method according to one or more embodiments of the present disclosure, a processor-implemented method takes about 2 hours for the same work to be performed and for the user interface to be translated into 21 different languages, not just 2 languages, independent of any human intervention. The technical solutions provided by embodiments of the present disclosure provide tangible benefits in user interface text translation, for example by reducing processing time from 5 days to 2 hours, and performing a processor-implemented method instead of requiring human intervention or skill, while translating 21 languages instead of 2. This solves a computing problem of For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a system 100 configured for enabling user interface text translation, in accordance with one or more embodiments. The system comprises a translation coordinator 110 in communication with a design application 120 and a translation application 130. The design application 120 may be a design tool or application such as Figma™, Adobe™ XD or Sketch. The translation application 130 may be a translation tool or application such as Lokalise™ or Google™ Translate. The translation coordinator 110 may be configured to generate a plurality of translation keys 112. The translation coordinator 110 may comprise a user interface 114 providing prompts for obtaining data from the design application 120 and/or communicating data with the translation application 130, and for generating a translation key 112. The translation coordinator 110 may include a non-transient computer-readable storage medium having executable instructions embodied thereon.

The translation coordinator 110 may include one or more hardware processors configured to execute the instructions. The processor(s) may execute the instructions to obtain, from the design application 120, design application data. The processor(s) may execute the instructions to obtain, from the design application 120, original text associated with a user interface element. The original text may be in a first language, such as English. The processor(s) may execute the instructions to generate a translation key 112 based on the original text associated with the user interface element. The processor(s) may execute the instructions to send the translation key to the translation application 130. The processor(s) may execute the instructions to receive, from the translation application 130, a translation output associated with the translation key. The translation output may include translated text in a second language corresponding to the original text in the first language. The processor(s) may execute the instructions to provide, to the design application 120, the translation output for use in creating a translated user interface element in the second language related to the user interface element in the first language. The processor(s) may execute the instructions to provide, to the design application 120, instructions to cause display of the translation output in a translated user interface element in the second language related to the user interface element in the first language. The processor(s) may execute the instructions to provide, to the design application 120, instructions to cause insertion of the translation output in a translated user interface element in the second language related to the user interface element in the first language, and to cause display of the translation output in the translated user interface element.

The translation coordinator 110 may be configured to generate the translation key such that the translation key includes the original text. The translation key may also comprise a format indicator. For example, consider a scenario where the original text is "Subscribe Now". The translation key may be generated to be "% ph:emea_form: subscribe_now", where the "ph" portion indicates a format indicator for a phone, and the "subscribe_now" comprises the original text as part of the translation key itself. In this way, when the translation coordinator 110 provides the translation key 112, the translation key acts not only as an identifier and tracking means but also includes the original text to be translated and other information relevant to the translation. For example, the phone format indicator may be associated with a character limit or other formatting preference that may impact the format or number of characters in the translated text. In this way, the translation key 112 may be sufficient to provide both the text to be translated and instructions associated with the translation.

The translation coordinator 110 may be configured to send, to the translation application 130, a common text indicator. The common text indicator may indicate a plurality of different user interface elements which include the same original text identified by the translation key. In this way, the common text indicator may be used in preventing duplicate translation of the original text for each of the plurality of different user interface elements.

For example, if the original text "Subscribe Now" is found in 3 different user interface elements, the common text indicator may be used in conjunction with the translation key to ensure that the text "Subscribe Now" is only translated once, and the output is sent to each of the 3 different user interface elements. This avoids wasted processor and memory resources associated with inadvertently re-translating the "Subscribe Now" text 3 different times because it may be associated with 3 different translation keys. In an example embodiment, the translation coordinator may review a set of translation keys and identify common text based on a review of the original text portion of the translation key, and then generate and associate the common text indicator with the different user interface elements that include the original text.

The translation coordinator 110 may be configured to provide, to the design application 120, the translation output for automated population in the translated user interface element. Providing the translation output for automated population in the translated user interface element assists in avoiding delays and human error associated with manual entry of the translated text into the translated user interface elements. Providing the translation output for automated population in the translated user interface element also assists in providing a technical advantage over known approaches and enables embodiments of the present disclosure to output translated text into translated user interface elements in 2 hours for 21 languages, while known approaches would take a team of 3 people 5 days to provide the outputs for only 2 languages. Known approaches also include manual entry and require the professional skill of the operators, while embodiments of the present disclosure include automation that avoids the need of professional skill for aspects of user interface text translation.

The translation coordinator 110 may be configured to provide, to the design application 120, instructions to cause display of the translation output in a translated user interface element in the second language related to the user interface element in the first language. Providing instructions to cause display of the translation output in the translated user provides similar technical advantages to providing the translation output for automated population in the translated user interface element, such as performing a processor-implemented method independent of human involvement, which assists in avoiding delays and human error associated with manual entry of the translated text into the translated user interface elements, and provides a technical advantage over known approaches. The technical advantage enables embodiments of the present disclosure to output and cause display of translated text in translated user interface elements in 2 hours for 21 languages, while known approaches would take a team of 3 people 5 days to provide the outputs for only 2 languages.

The translation coordinator 110 may be configured to send, to the design application 120, a command to modify a layer name associated with the user interface element such that the modified layer name includes the translation key. This may provide an advantage of enabling or facilitating translation of an entire layer, when this is desired. Also, by modifying a layer name to include the translation key, the translation coordinator 110 may be configured to scrape contents of layer names to obtain translation keys. Such an implementation enables the translation coordinator 110 to interact with a design application in a way that is more backwards-compatible and facilitates retrofitting the translation coordinator 110 with an existing design application by re-using the layer name to incorporate the translation key. This solves a computing problem by providing a solution that reduces the amount of resources required, by re-using an existing layer name to incorporate the translation key, saving on storage and processing resources. Such an implementation may also speed up translation of user interface elements in a layer when all user interface elements include text to be translated, by including the translation key in the layer name either in addition to or instead of in a separately stored translation key.

In an example embodiment, the translation coordinator 110 may be configured to enable user interface text translation relating to a translation key and a plurality of translation languages. The translation coordinator 110 may be configured to send, to the translation application 130, an indication of a plurality of translation languages. The translation coordinator 110 may be configured to receive, from the translation application 130, the translation output associated with the translation key 112. The translation output may include translated text in the plurality of translation languages corresponding to the original text in the first language. The translation coordinator 110 may be configured to provide, to the design application 120, the translation output for use in creating a plurality of translated user interface elements in the plurality of translation languages related to the user interface element in the first language.

The translation coordinator 110 may be configured to obtain, from the design application 120, original text associated with each of a plurality of user interface elements. The translation coordinator 110 may be configured to concurrently generate a plurality of translation keys 112 based on the original text associated with the plurality of user interface elements. Functioning of a computer is improved by concurrent generation of a plurality of translation keys as the computer may be configured to transmit the plurality of translation keys together, enabling a faster and more efficient result for generation of the translated text. This reduces processing time and resources compared to waiting for the plurality of translation keys to be sequentially generated before being able to transmit them to initiate the translation. Functioning of a computer is improved by concurrent generation of a plurality of translation keys as the computer may be configured to analyze the plurality of translation keys, for example to identify common text associated with a set of translation keys. This reduces processing time and resources compared to waiting for the plurality of translation keys to be sequentially generated before being able to either analyze them or transmit them. The translation coordinator 110 may be configured to send the plurality of translation keys 112 to the translation application 130.

The translation coordinator 110 may be configured to receive, from the translation application 130, translation outputs associated with each of the plurality of translation keys. The translation outputs each may include translated text in a second language corresponding to the original text in the first language. The translation coordinator 110 may be configured to provide, to the design application 120, the translation outputs for use in creating a plurality of translated user interface elements in the second language related to the user interface element in the first language.

The translation coordinator 110 may be configured to send, to the translation application 130, an indication of a plurality of translation languages. The translation coordinator 110 may be configured to receive, from the translation application 130, translation outputs associated with each of the plurality of translation keys. The translation outputs each may include translated text in the plurality of translation languages corresponding to the original text in the first language. The translation coordinator 110 may be configured to provide, to the design application 120, the translation outputs for use in creating a plurality of translated user interface elements in the plurality of translation languages related to the user interface element in the first language.

The original text may include a text field identifier and text field content. The translated user interface element may include a translated text field into which the translation output in the second language may be incorporated. For example, for the original text "Subscribe Now", a text field identifier may be "_subscribe" and the text field content in the first language may be "Subscribe Now". The translated user interface element may include a translated text field, such as "_suscribase" into which the translation output "Suscríbase ahora" may be incorporated.

In some implementations, the translation output may be based on previously-generated translation data stored in a translation memory and associated with the translation key. For example, when the original text "Subscribe Now" is translated, a corresponding translation output may be stored in the translation memory and associated with the translation key, which itself may be associated with the original text. The translation output may be associated with a plurality of translation keys that each comprise the original text, for example if the original text is common to a plurality of user interface elements. In some implementations, the translation output may be based on translation data generated by the translation application after sending the translation key. The use of a plurality of translation keys and/or the identification of original text common to a plurality of user interface elements provide improvements in processor efficiency, memory efficiency and reduce the use of translation and data transmission resources compared to known approaches, for example that may re-translate instances of repeated or common text. This solves a computing problem by providing a solution that reduces the amount of text translation resources and data transmission resources required, while improving user experience and reducing resource costs associated with the translation and transmission of translated text, for example by generating and transmitting the translation key(s).

In some implementations of the computing platform, the method may be performed by a plugin associated with the design application. For example, the translation coordinator 110 may be implemented as a plugin, such as a Figma™ plugin when the design application 120 being used is Figma™.

Figure 2:
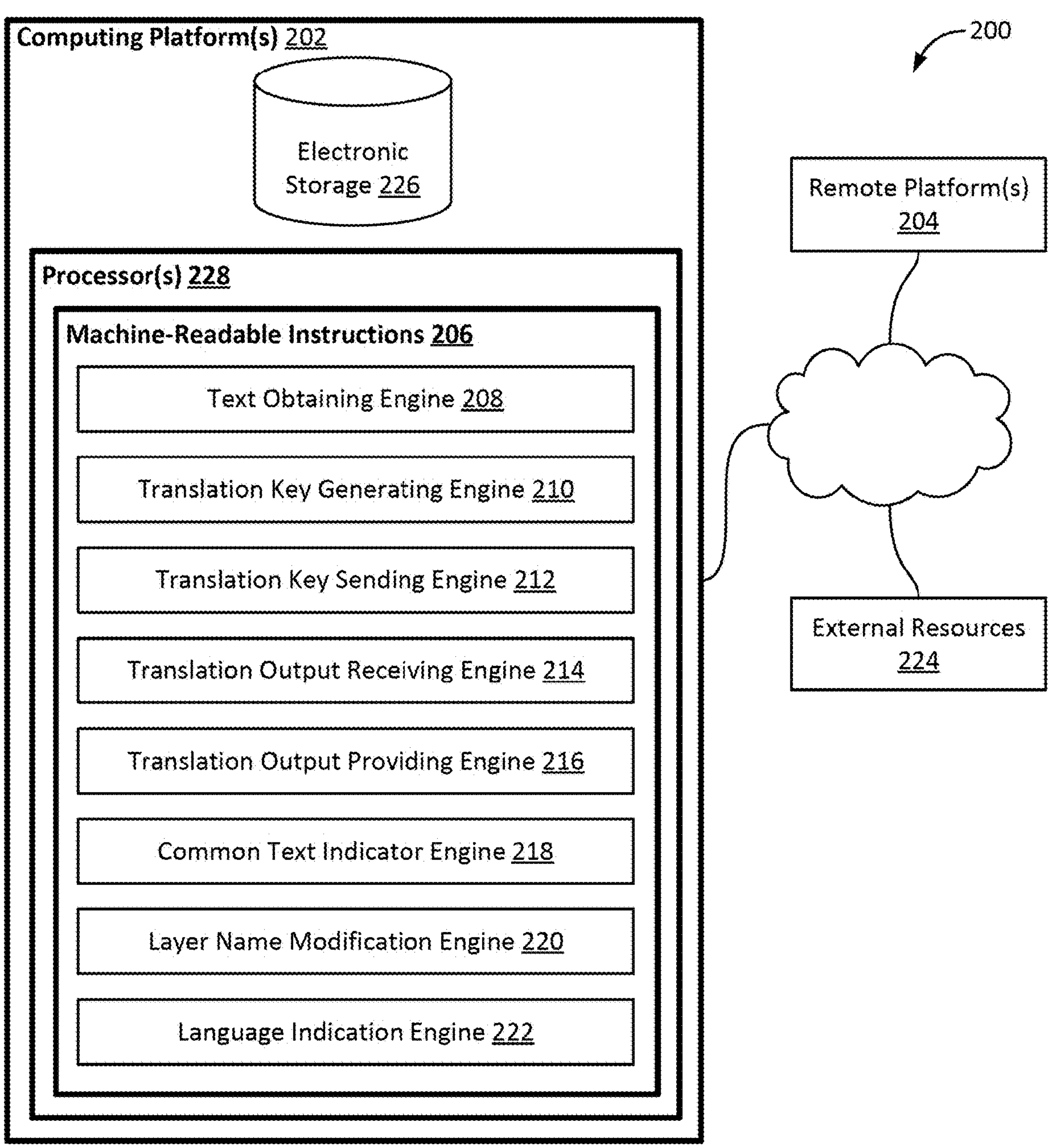
FIG. 2 illustrates another system configured for enabling user interface text translation, in accordance with one or more embodiments.

FIG. 2 illustrates a system 200 configured for enabling user interface text translation, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction engines. The instruction engines may include computer program engines. The instruction engines may include one or more of text obtaining engine 208, translation key generating engine 210, translation key sending engine 212, translation output receiving engine 214, translation output providing engine 216, common text indicator engine 218, layer name modification engine 220, language indication engine 222, and/or other instruction engines.

Text obtaining engine 208 may be configured to obtain, from a design application, original text associated with a user interface element. The method may be performed by a plugin associated with the design application, such as a Figma™ plugin for use with the Figma™ application. The original text may be in a first language, such as English.

Text obtaining engine 208 may be configured to obtain, from the design application, original text associated with each of a plurality of user interface elements. The original text may include a text field identifier and text field content.

Translation key generating engine 210 may be configured to generate a translation key based on the original text associated with the user interface element. Translation key generating engine 210 may be configured to generate the translation key such that the translation key includes the original text. Translation key generating engine 210 may be configured to concurrently generate a plurality of translation keys based on the original text associated with the plurality of user interface elements.

Translation key sending engine 212 may be configured to send the translation key to a translation application. Translation key sending engine 212 may be configured to send a plurality of translation keys to the translation application.

Translation output receiving engine 214 may be configured to receive, from the translation application, a translation output associated with the translation key. The translation output may be based on previously-generated translation data stored in a translation memory and associated with the translation key, as described above. The translation output may be based on translation data generated by the translation application after sending the translation key. The translation output may include translated text in a second language corresponding to the original text in the first language.

Translation output receiving engine 214 may be configured to receive, from the translation application, the translation output associated with the translation key. The translation output may include translated text in a plurality of translation languages corresponding to the original text in the first language. Such an implementation may be implemented with respect to a translation key and a plurality of translation languages.

Translation output receiving engine 214 may be configured to receive, from the translation application, translation outputs associated with each of a plurality of translation keys. The translation outputs each may include translated text in a second language corresponding to the original text in the first language. Such an implementation may be implemented with respect to a plurality of translation keys and a translation language.

Translation output receiving engine 214 may be configured to receive, from the translation application, translation outputs associated with each of a plurality of translation keys. The translation outputs each may include translated text in the plurality of translation languages corresponding to the original text in the first language. Such an implementation may be implemented with respect to a plurality of translation keys and a plurality of translation languages.

Translation output providing engine 216 may be configured to provide, to the design application, the translation output for use in creating a translated user interface element in the second language related to the user interface element in the first language. The translated user interface element may include a translated text field in which the translation output in the second language may be incorporated. Translation output providing engine 216 may be configured to provide, to the design application, the translation output for automated population in the translated user interface element. Translation output providing engine 216 may be configured to provide, to the design application, the translation output for use in creating a plurality of translated user interface elements in the plurality of translation languages related to the user interface element in the first language.

Common text indicator engine 218 may be configured to send, to the translation application, a common text indicator indicating a plurality of different user interface elements which include the original text identified by the translation key, for use in preventing duplicate translation of the original text for each of the plurality of different user interface elements.

Layer name modification engine 220 may be configured to send, to the design application, a command to modify a layer name associated with the user interface element such that the modified layer name includes the translation key.

Language indication engine 222 may be configured to send, to the translation application, an indication of a plurality of translation languages.

Translation output providing engine 216 may also be configured to provide, to the design application, the translation outputs for use in creating a plurality of translated user interface elements in the second language related to the user interface element in the first language.

Translation output providing engine 216 may also be configured to provide, to the design application, the translation outputs for use in creating a plurality of translated user interface elements in the plurality of translation languages related to the user interface element in the first language.

In some embodiments, computing platform(s) 202, remote platform(s) 204, and/or external resources 224 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 224 may be operatively linked via some other communication media.

A given remote platform 204 may include one or more processors configured to execute computer program engines. The computer program engines may be configured to enable an expert or user associated with the given remote platform 204 to interface with system 200 and/or external resources 224, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 224 may include sources of information outside of system 200, external entities participating with system 200, and/or other resources. In some embodiments, some or all of the functionality attributed herein to external resources 224 may be provided by resources included in system 200.

Computing platform(s) 202 may include electronic storage 226, one or more processors 228, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 226 may comprise non-transitory storage media that electronically stores information. The electronic storage media of electronic storage 226 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 226 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 226 may include one or more virtual storage resources (e.g., cloud storage, a virtual private network, and/or other virtual storage resources). Electronic storage 226 may store software algorithms, information determined by processor(s) 228, information received from computing platform(s) 202, information received from remote platform(s) 204, and/or other information that enables computing platform(s) 202 to function as described herein.

Processor(s) 228 may be configured to provide information processing capabilities in computing platform(s) 202. As such, processor(s) 228 may include one or more of a digital processor, an analog processor, a digital circuit designed to process information, an analog circuit designed to process information, a state machine, and/or other mechanisms for electronically processing information. Although processor(s) 228 is shown in FIG. 2 as a single entity, this is for illustrative purposes only. In some embodiments, processor(s) 228 may include a plurality of processing units. These processing units may be physically located within the same device, or processor(s) 228 may represent processing functionality of a plurality of devices operating in coordination. Processor(s) 228 may be configured to execute engines 208, 210, 212, 214, 216, 218, 220, and/or 222, and/or other engines. Processor(s) 228 may be configured to execute engines 208, 210, 212, 214, 216, 218, 220, and/or 222, and/or other engines by software; hardware; firmware; some combination of software, hardware, and/or firmware; and/or other mechanisms for configuring processing capabilities on processor(s) 228. As used herein, the term "engine" may refer to any component or set of components that perform the functionality attributed to the engine. This may include one or more physical processors during execution of processor readable instructions, the processor readable instructions, circuitry, hardware, storage media, or any other components.

It should be appreciated that although engines 208, 210, 212, 214, 216, 218, 220, and/or 222 are illustrated in FIG. 2 as being implemented within a single processing unit, in embodiments in which processor(s) 230 includes multiple processing units, one or more of engines 208, 210, 212, 214, 216, 218, 220 and/or 222 may be implemented remotely from the other engines. The description of the functionality provided by the different engines 208, 210, 212, 214, 216, 218, 220 and/or 222 described below is for illustrative purposes, and is not intended to be limiting, as any of engines 208, 210, 212, 214, 216, 218, 220 and/or 222 may provide more or less functionality than is described. For example, one or more of engines 208, 210, 212, 214, 216, 218, 220 and/or 222 may be eliminated, and some or all of its functionality may be provided by other ones of engines 208, 210, 212, 214, 216, 218, 220 and/or 222. As another example, processor(s) 230 may be configured to execute one or more additional engines that may perform some or all of the functionality attributed below to one of engines 208, 210, 212, 214, 216, 218, 220 and/or 222.

Figure 3:
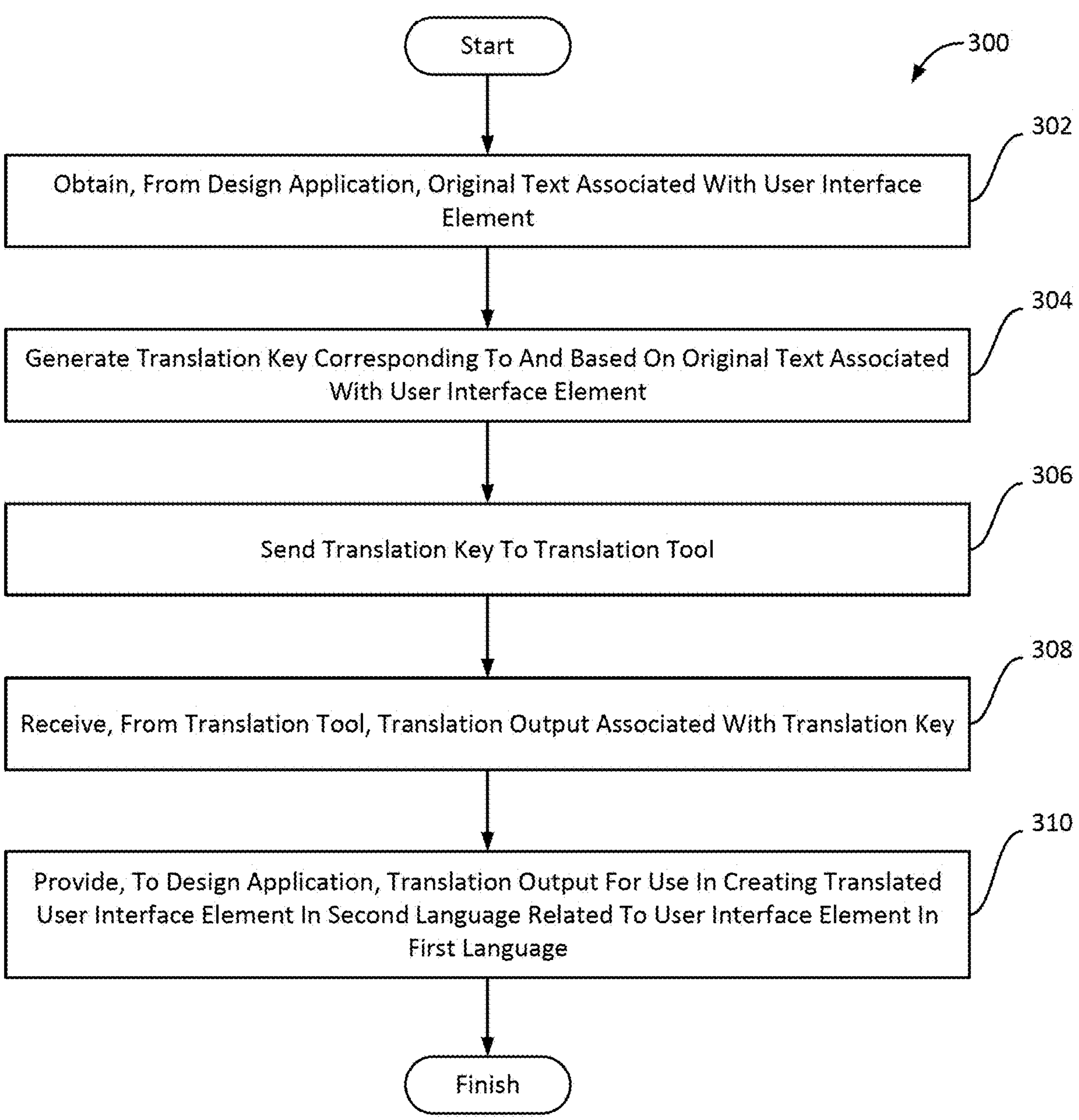
FIG. 3 illustrates a method for enabling user interface text translation, in accordance with one or more embodiments.

FIG. 3 illustrates a method 300 for enabling user interface text translation, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining, from a design application, original text associated with a user interface element. The original text may be in a first language. Operation 302 may be performed by one or more hardware processors configured by machine-readable instructions including a engine that is the same as or similar to text obtaining engine 208, in accordance with one or more embodiments.

An operation 304 may include generating a translation key based on the original text associated with the user interface element. Operation 304 may be performed by one or more hardware processors configured by machine-readable instructions including a engine that is the same as or similar to translation key generating engine 210, in accordance with one or more embodiments.

An operation 306 may include sending the translation key to a translation application. Operation 306 may be performed by one or more hardware processors configured by machine-readable instructions including a engine that is the same as or similar to translation key sending engine 212, in accordance with one or more embodiments.

An operation 308 may include receiving, from the translation application, a translation output associated with the translation key. The translation output may include translated text in a second language corresponding to the original text in the first language. Operation 308 may be performed by one or more hardware processors configured by machine-readable instructions including a engine that is the same as or similar to translation output receiving engine 214, in accordance with one or more embodiments.

An operation 310 may include providing, to the design application, the translation output for use in creating a translated user interface element in the second language related to the user interface element in the first language. Operation 310 may be performed by one or more hardware processors configured by machine-readable instructions including a engine that is the same as or similar to translation output providing engine 216, in accordance with one or more embodiments.

Figure 4:
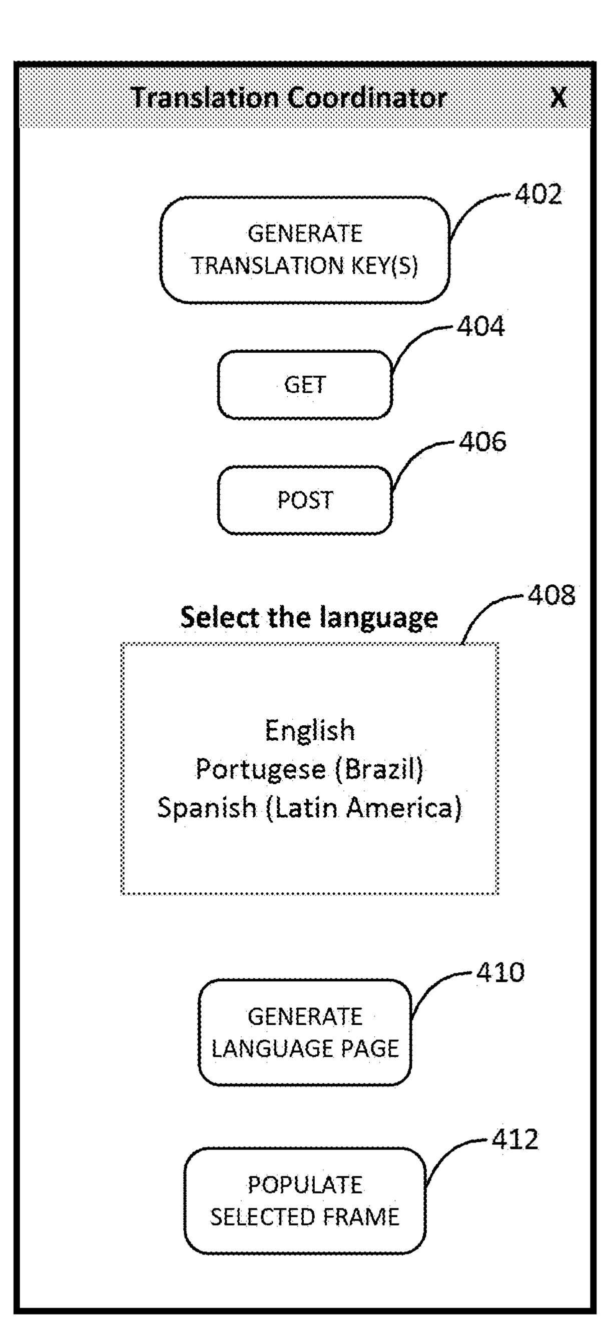
FIG. 4 illustrates a graphical user interface for enabling user interface text translation, in accordance with one or more embodiments.

FIG. 4 illustrates a graphical user interface 400 for enabling user interface text translation, in accordance with one or more embodiments. A system 100 or a system 200 according to embodiments of the present disclosure may be configured to generate the graphical user interface 400. A system 100 or a system 200 according to embodiments of the present disclosure may be configured to employ the graphical user interface 400 to assist in performing one or more actions, such as those described and illustrated in relation to FIG. 3, to enable user interface text translation. The graphical user interface 400 may be similar to the graphical user interface 114 of FIG. 1 associated with the translation coordinator 110.

The graphical user interface 400 may comprise one or more elements, the actuation of which may cause performance of one or more actions. Actuation of a graphical user interface element may comprise selection, for example by clicking, tapping or pressing on the element, or other actuation mechanisms associated with a platform or screen type on which the graphical user interface 400 is provided. The graphical user interface 400 comprises a translation key generator 402, the actuation of which may cause generation of a translation key based on original text associated with a user interface element. Actuation of a data obtainer 404 may cause a system to obtain or get translated text associated with the original text identified in the translation key. Actuation of a data provider 406 may cause a system to provide or post data associated with original text and/or a generated translation key, and may cause the data to be provided to a translation application.

Actuation of a language selector 408 may facilitate or enable selection of one or more languages, either as the first or original language or as a language into which the original text is to be translated. Actuation of language page generator 410 may be configured to cause generation of a language page, for example a page including a plurality of user interface elements into which translated text is to be populated. Actuation of frame populator 412 may cause population of a selected frame with the translated text associated with the original text from the original frame.

Consider the following example implementation with respect to FIG. 4 and FIG. 1. The user interface 400, which is similar to the user interface 112, may be provided by a translation coordinator 110, which is in communication with a design application 120 and a translation application 130. The translation application 130 may have or be associated with a translation memory. If a key is created with the English text (e.g. Subscribe now), the translation memory may be employed by the translation application 130 and/or the translation coordinator 110 to recognize whether the English text is the same as, or matches, content of the translation memory, and to get the translation output for that key. The translation coordinator 110 may be configured to create a translation key 112, which can be provided to the translation application 130. Actuation of the translation key generator 402 may cause renaming of a layer name in the design application 110 so that the layer name includes the translation key 112, where the translation key may comprise the original text.

Actuation of the data provider 406 may cause the data, for example the translation key 112, to be provided to the translation application 130. The translation application 130 may be configured to receive a message including the translation key 112. The first part of the translation key 112 may comprise the frame name, and the second part of the translation key 112 may comprise the original text or English content. Based on the translation key 112, the English text may be inserted into the translation application 130.

Figure 5:
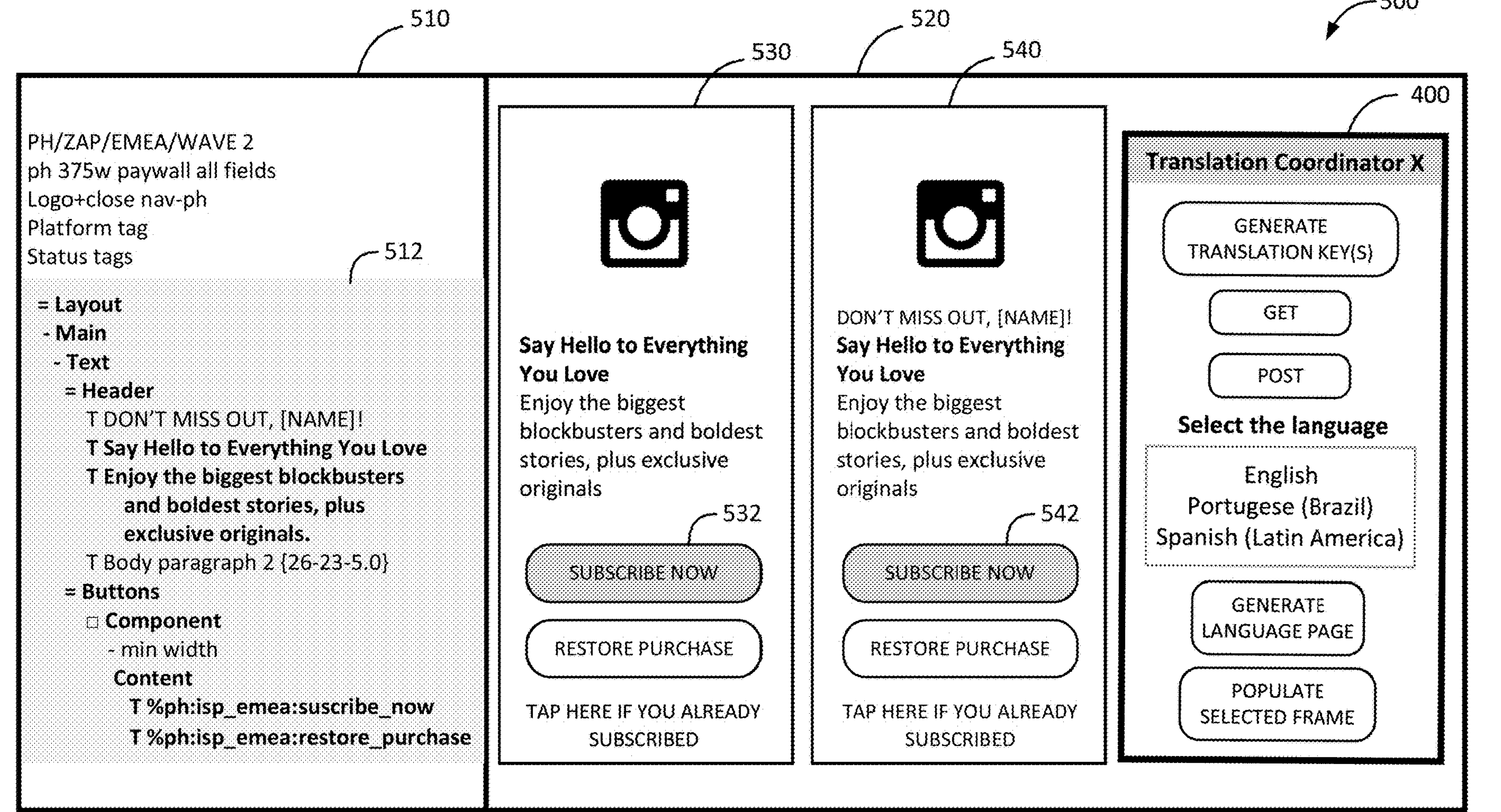
FIG. 5 illustrates a graphical user interface for enabling user interface text translation shown together with a related design application, in accordance with one or more embodiments.

FIG. 5 illustrates a translation coordinator graphical user interface 400 for enabling user interface text translation shown together with a related design application user interface 500, in accordance with one or more embodiments. The translation coordinator user interface 400 is shown in an example operational position in which it is visible alongside the design application user interface 500. The design application user interface 500 may comprise a code viewer 510 configured to display software code associated with one or more user interface elements in the design application. Consider when a plurality of layer names/keys are selected, such as shown at 512 by the gray selection box. According to an embodiment, in response to selection of the plurality of layer names/keys as shown at 512, the translation coordinator 110 may be configured to concurrently generate a plurality of translation keys 112 corresponding to the selected user interface elements.

As shown in FIG. 5, the design application user interface 500 may comprise a design viewer 520. The design viewer 120 may comprise user interface blocks 530 and 540, which comprise user interface elements 532 and 542, respectively. User interface elements 532 and 542 have the same original text, and therefore may be associated with the same translation key, or their different translation keys may be linked or associated with each other. This may be implemented using a common text indicator, as described earlier, for example in relation to FIG. 2.

After selecting multiple layer names, actuation of a "Post" user interface element in FIG. 5, which may be similar to the data provider 406 of FIG. 4, may cause concurrent generation of the plurality of translation keys. Actuation of a Get user interface element in FIG. 5, which may be similar to the data obtainer 404 of FIG. 4, may cause the translation coordinator 110 to obtain or get translations, for example translations associated with a selected block. Actuation of a "Generate Language Pages" element, which may be similar to language page generator 410, may cause the block or page to be generated as a whole, still with the original English text. Actuation of the "Populate Selected Frame" element, which may be similar to frame populator 412, may cause replacement of the English text with the translated text in the other language, one element by one. In another embodiment, functions associated with the Generate Language Pages and the Populate Selected Frame elements may be combined, so that the block or page is generated as a whole, and the translated text is then automatically inserted in the absence of any further user input.

In an embodiment, the present disclosure provides a system and method for coordinating translation of text included in a user interface. User interface development may be performed using a design application. Compared to known approaches by manually copying and pasting data from a translation application to a design application, embodiments of the present disclosure takes about 2 hours for the same work to be performed as known approaches would take 5 days and 3 people to complete. The technical solutions provided by embodiments of the present disclosure provide tangible benefits in user interface text translation, for example by reducing processing time and the associated memory usage, and avoiding the need to rely on professional skill of a UX designer or writer to perform user interface text translation.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following clauses, with specific features laid out in the dependent clauses:

One aspect of the present disclosure relates to a system configured for enabling user interface text translation. The system may include one or more hardware processors configured by machine-readable instructions. The processor(s) may be configured to obtain, from a design application, original text associated with a user interface element. The original text may be in a first language. The processor(s) may be configured to generate a translation key based on the original text associated with the user interface element. The processor(s) may be configured to send the translation key to a translation application. The processor(s) may be configured to receive, from the translation application, a translation output associated with the translation key. The translation output may include translated text in a second language corresponding to the original text in the first language. The processor(s) may be configured to provide, to the design application, the translation output for use in creating a translated user interface element in the second language related to the user interface element in the first language.

In some implementations of the system, the processor(s) may be configured to generate the translation key such that the translation key includes the original text.

In some implementations of the system, the processor(s) may be configured to send, to the translation application, a common text indicator indicating a plurality of different user interface elements which include the original text identified by the translation key, for use in preventing duplicate translation of the original text for each of the plurality of different user interface elements.

In some implementations of the system, the processor(s) may be configured to provide, to the design application, the translation output for automated population in the translated user interface element.

In some implementations of the system, the processor(s) may be configured to send, to the design application, a command to modify a layer name associated with the user interface element such that the modified layer name includes the translation key.

In some implementations of the system, the processor(s) may be configured to send, to the translation application, an indication of a plurality of translation languages. In some implementations of the system, the processor(s) may be configured to receive, from the translation application, the translation output associated with the translation key. In some implementations of the system, the translation output may include translated text in the plurality of translation languages corresponding to the original text in the first language. In some implementations of the system, the processor(s) may be configured to provide, to the design application, the translation output for use in creating a plurality of translated user interface elements in the plurality of translation languages related to the user interface element in the first language.

In some implementations of the system, the processor(s) may be configured to obtain, from the design application, original text associated with each of a plurality of user interface elements. In some implementations of the system, the processor(s) may be configured to concurrently generate a plurality of translation keys based on the original text associated with the plurality of user interface elements. In some implementations of the system, the processor(s) may be configured to send the plurality of translation keys to the translation application.

In some implementations of the system, the processor(s) may be configured to receive, from the translation application, translation outputs associated with each of the plurality of translation keys. In some implementations of the system, the translation outputs each may include translated text in a second language corresponding to the original text in the first language. In some implementations of the system, the processor(s) may be configured to provide, to the design application, the translation outputs for use in creating a plurality of translated user interface elements in the second language related to the user interface element in the first language.

In some implementations of the system, the processor(s) may be configured to send, to the translation application, an indication of a plurality of translation languages. In some implementations of the system, the processor(s) may be configured to receive, from the translation application, translation outputs associated with each of the plurality of translation keys. In some implementations of the system, the translation outputs each may include translated text in the plurality of translation languages corresponding to the original text in the first language. In some implementations of the system, the processor(s) may be configured to provide, to the design application, the translation outputs for use in creating a plurality of translated user interface elements in the plurality of translation languages related to the user interface element in the first language.

In some implementations of the system, the translation output may be based on previously-generated translation data stored in a translation memory and associated with the translation key.

In some implementations of the system, the translation output may be based on translation data generated by the translation application after sending the translation key.

In some implementations of the system, the method may be performed by a plugin associated with the design application.

In some implementations of the system, the original text may include a text field identifier and text field content. In some implementations of the system, the translated user interface element includes a translated text field for may incorporate the translation output in the second language.

Another aspect of the present disclosure relates to a method for enabling user interface text translation. The method may include obtaining, from a design application, original text associated with a user interface element. The original text may be in a first language. The method may include generating a translation key based on the original text associated with the user interface element. The method may include sending the translation key to a translation application. The method may include receiving, from the translation application, a translation output associated with the translation key. The translation output may include translated text in a second language corresponding to the original text in the first language. The method may include providing, to the design application, the translation output for use in creating a translated user interface element in the second language related to the user interface element in the first language.

In some implementations of the method, it may include generating the translation key such that the translation key includes the original text.

In some implementations of the method, it may include sending, to the translation application, a common text indicator indicating a plurality of different user interface elements which include the original text identified by the translation key, for use in preventing duplicate translation of the original text for each of the plurality of different user interface elements.

In some implementations of the method, it may include providing, to the design application, the translation output for automated population in the translated user interface element.

In some implementations of the method, it may include sending, to the design application, a command to modify a layer name associated with the user interface element such that the modified layer name includes the translation key.

In some implementations of the method, it may include sending, to the translation application, an indication of a plurality of translation languages. In some implementations of the method, it may include receiving, from the translation application, the translation output associated with the translation key. In some implementations of the method, the translation output may include translated text in the plurality of translation languages corresponding to the original text in the first language. In some implementations of the method, it may include providing, to the design application, the translation output for use in creating a plurality of translated user interface elements in the plurality of translation languages related to the user interface element in the first language.

In some implementations of the method, it may include obtaining, from the design application, original text associated with each of a plurality of user interface elements. In some implementations of the method, it may include concurrently generating a plurality of translation keys based on the original text associated with the plurality of user interface elements. In some implementations of the method, it may include sending the plurality of translation keys to the translation application.

In some implementations of the method, it may include receiving, from the translation application, translation outputs associated with each of the plurality of translation keys. In some implementations of the method, the translation outputs each may include translated text in a second language corresponding to the original text in the first language. In some implementations of the method, it may include providing, to the design application, the translation outputs for use in creating a plurality of translated user interface elements in the second language related to the user interface element in the first language.

In some implementations of the method, it may include sending, to the translation application, an indication of a plurality of translation languages. In some implementations of the method, it may include receiving, from the translation application, translation outputs associated with each of the plurality of translation keys. In some implementations of the method, the translation outputs each may include translated text in the plurality of translation languages corresponding to the original text in the first language. In some implementations of the method, it may include providing, to the design application, the translation outputs for use in creating a plurality of translated user interface elements in the plurality of translation languages related to the user interface element in the first language.

In some implementations of the method, the translation output may be based on previously-generated translation data stored in a translation memory and associated with the translation key.

In some implementations of the method, the translation output may be based on translation data generated by the translation application after sending the translation key.

In some implementations of the method, the method may be performed by a plugin associated with the design application.

In some implementations of the method, the original text may include a text field identifier and text field content. In some implementations of the method, the translated user interface element includes a translated text field for may incorporate the translation output in the second language.

Yet another aspect of the present disclosure relates to a non-transient computer-readable storage medium having instructions embodied thereon, the instructions being executable by one or more processors to perform a method for enabling user interface text translation. The method may include obtaining, from a design application, original text associated with a user interface element. The original text may be in a first language. The method may include generating a translation key based on the original text associated with the user interface element. The method may include sending the translation key to a translation application. The method may include receiving, from the translation application, a translation output associated with the translation key. The translation output may include translated text in a second language corresponding to the original text in the first language. The method may include providing, to the design application, the translation output for use in creating a translated user interface element in the second language related to the user interface element in the first language.

In some implementations of the computer-readable storage medium, the method may include generating the translation key such that the translation key includes the original text.

In some implementations of the computer-readable storage medium, the method may include sending, to the translation application, a common text indicator indicating a plurality of different user interface elements which include the original text identified by the translation key, for use in preventing duplicate translation of the original text for each of the plurality of different user interface elements.

In some implementations of the computer-readable storage medium, the method may include providing, to the design application, the translation output for automated population in the translated user interface element.

In some implementations of the computer-readable storage medium, the method may include sending, to the design application, a command to modify a layer name associated with the user interface element such that the modified layer name includes the translation key.

In some implementations of the computer-readable storage medium, the method may include sending, to the translation application, an indication of a plurality of translation languages. In some implementations of the computer-readable storage medium, the method may include receiving, from the translation application, the translation output associated with the translation key. In some implementations of the computer-readable storage medium, the translation output may include translated text in the plurality of translation languages corresponding to the original text in the first language. In some implementations of the computer-readable storage medium, the method may include providing, to the design application, the translation output for use in creating a plurality of translated user interface elements in the plurality of translation languages related to the user interface element in the first language.

In some implementations of the computer-readable storage medium, the method may include obtaining, from the design application, original text associated with each of a plurality of user interface elements. In some implementations of the computer-readable storage medium, the method may include concurrently generating a plurality of translation keys based on the original text associated with the plurality of user interface elements. In some implementations of the computer-readable storage medium, the method may include sending the plurality of translation keys to the translation application.

In some implementations of the computer-readable storage medium, the method may include receiving, from the translation application, translation outputs associated with each of the plurality of translation keys. In some implementations of the computer-readable storage medium, the translation outputs each may include translated text in a second language corresponding to the original text in the first language. In some implementations of the computer-readable storage medium, the method may include providing, to the design application, the translation outputs for use in creating a plurality of translated user interface elements in the second language related to the user interface element in the first language.

In some implementations of the computer-readable storage medium, the method may include sending, to the translation application, an indication of a plurality of translation languages. In some implementations of the computer-readable storage medium, the method may include receiving, from the translation application, translation outputs associated with each of the plurality of translation keys. In some implementations of the computer-readable storage medium, the translation outputs each may include translated text in the plurality of translation languages corresponding to the original text in the first language. In some implementations of the computer-readable storage medium, the method may include providing, to the design application, the translation outputs for use in creating a plurality of translated user interface elements in the plurality of translation languages related to the user interface element in the first language.

In some implementations of the computer-readable storage medium, the translation output may be based on previously-generated translation data stored in a translation memory and associated with the translation key.

In some implementations of the computer-readable storage medium, the translation output may be based on translation data generated by the translation application after sending the translation key.

In some implementations of the computer-readable storage medium, the method may be performed by a plugin associated with the design application.

In some implementations of the computer-readable storage medium, the original text may include a text field identifier and text field content. In some implementations of the computer-readable storage medium, the translated user interface element includes a translated text field for may incorporate the translation output in the second language.

Still another aspect of the present disclosure relates to a system configured for enabling user interface text translation. The system may include means for obtaining, from a design application, original text associated with a user interface element. The original text may be in a first language. The system may include means for generating a translation key based on the original text associated with the user interface element. The system may include means for sending the translation key to a translation application. The system may include means for receiving, from the translation application, a translation output associated with the translation key. The translation output may include translated text in a second language corresponding to the original text in the first language. The system may include means for providing, to the design application, the translation output for use in creating a translated user interface element in the second language related to the user interface element in the first language.

In some implementations of the system, the system may include means for generating the translation key such that the translation key includes the original text.

In some implementations of the system, the system may include means for sending, to the translation application, a common text indicator indicating a plurality of different user interface elements which include the original text identified by the translation key, for use in preventing duplicate translation of the original text for each of the plurality of different user interface elements.

In some implementations of the system, the system may include means for providing, to the design application, the translation output for automated population in the translated user interface element.

In some implementations of the system, the system may include means for sending, to the design application, a command to modify a layer name associated with the user interface element such that the modified layer name includes the translation key.

In some implementations of the system, the system may include means for sending, to the translation application, an indication of a plurality of translation languages. In some implementations of the system, the system may include means for receiving, from the translation application, the translation output associated with the translation key. In some implementations of the system, the translation output may include translated text in the plurality of translation languages corresponding to the original text in the first language. In some implementations of the system, the system may include means for providing, to the design application, the translation output for use in creating a plurality of translated user interface elements in the plurality of translation languages related to the user interface element in the first language.

In some implementations of the system, the system may include means for obtaining, from the design application, original text associated with each of a plurality of user interface elements. In some implementations of the system, the system may include means for concurrently generating a plurality of translation keys based on the original text associated with the plurality of user interface elements. In some implementations of the system, the system may include means for sending the plurality of translation keys to the translation application.

In some implementations of the system, the system may include means for receiving, from the translation application, translation outputs associated with each of the plurality of translation keys. In some implementations of the system, the translation outputs each may include translated text in a second language corresponding to the original text in the first language. In some implementations of the system, the system may include means for providing, to the design application, the translation outputs for use in creating a plurality of translated user interface elements in the second language related to the user interface element in the first language.

In some implementations of the system, the system may include means for sending, to the translation application, an indication of a plurality of translation languages. In some implementations of the system, the system may include means for receiving, from the translation application, translation outputs associated with each of the plurality of translation keys. In some implementations of the system, the translation outputs each may include translated text in the plurality of translation languages corresponding to the original text in the first language. In some implementations of the system, the system may include means for providing, to the design application, the translation outputs for use in creating a plurality of translated user interface elements in the plurality of translation languages related to the user interface element in the first language.

In some implementations of the system, the translation output may be based on previously-generated translation data stored in a translation memory and associated with the translation key.

In some implementations of the system, the translation output may be based on translation data generated by the translation application after sending the translation key.

In some implementations of the system, the method may be performed by a plugin associated with the design application.

In some implementations of the system, the original text may include a text field identifier and text field content. In some implementations of the system, the translated user interface element includes a translated text field for may incorporate the translation output in the second language.

Even another aspect of the present disclosure relates to a computing platform configured for enabling user interface text translation. The computing platform may include a non-transient computer-readable storage medium having executable instructions embodied thereon. The computing platform may include one or more hardware processors configured to execute the instructions. The processor(s) may execute the instructions to obtain, from a design application, original text associated with a user interface element. The original text may be in a first language. The processor(s) may execute the instructions to generate a translation key based on the original text associated with the user interface element. The processor(s) may execute the instructions to send the translation key to a translation application. The processor(s) may execute the instructions to receive, from the translation application, a translation output associated with the translation key. The translation output may include translated text in a second language corresponding to the original text in the first language. The processor(s) may execute the instructions to provide, to the design application, the translation output for use in creating a translated user interface element in the second language related to the user interface element in the first language.

In some implementations of the computing platform, the processor(s) may execute the instructions to generate the translation key such that the translation key includes the original text.

In some implementations of the computing platform, the processor(s) may execute the instructions to send, to the translation application, a common text indicator indicating a plurality of different user interface elements which include the original text identified by the translation key, for use in preventing duplicate translation of the original text for each of the plurality of different user interface elements.

In some implementations of the computing platform, the processor(s) may execute the instructions to provide, to the design application, the translation output for automated population in the translated user interface element.

In some implementations of the computing platform, the processor(s) may execute the instructions to send, to the design application, a command to modify a layer name associated with the user interface element such that the modified layer name includes the translation key.

In some implementations of the computing platform, the processor(s) may execute the instructions to send, to the translation application, an indication of a plurality of translation languages. In some implementations of the computing platform, the processor(s) may execute the instructions to receive, from the translation application, the translation output associated with the translation key. In some implementations of the computing platform, the translation output may include translated text in the plurality of translation languages corresponding to the original text in the first language. In some implementations of the computing platform, the processor(s) may execute the instructions to provide, to the design application, the translation output for use in creating a plurality of translated user interface elements in the plurality of translation languages related to the user interface element in the first language.

In some implementations of the computing platform, the processor(s) may execute the instructions to obtain, from the design application, original text associated with each of a plurality of user interface elements. In some implementations of the computing platform, the processor(s) may execute the instructions to concurrently generate a plurality of translation keys based on the original text associated with the plurality of user interface elements. In some implementations of the computing platform, the processor(s) may execute the instructions to send the plurality of translation keys to the translation application.

In some implementations of the computing platform, the processor(s) may execute the instructions to receive, from the translation application, translation outputs associated with each of the plurality of translation keys. In some implementations of the computing platform, the translation outputs each may include translated text in a second language corresponding to the original text in the first language. In some implementations of the computing platform, the processor(s) may execute the instructions to provide, to the design application, the translation outputs for use in creating a plurality of translated user interface elements in the second language related to the user interface element in the first language.

In some implementations of the computing platform, the processor(s) may execute the instructions to send, to the translation application, an indication of a plurality of translation languages. In some implementations of the computing platform, the processor(s) may execute the instructions to receive, from the translation application, translation outputs associated with each of the plurality of translation keys. In some implementations of the computing platform, the translation outputs each may include translated text in the plurality of translation languages corresponding to the original text in the first language. In some implementations of the computing platform, the processor(s) may execute the instructions to provide, to the design application, the translation outputs for use in creating a plurality of translated user interface elements in the plurality of translation languages related to the user interface element in the first language.

In some implementations of the computing platform, the translation output may be based on previously-generated translation data stored in a translation memory and associated with the translation key.

In some implementations of the computing platform, the translation output may be based on translation data generated by the translation application after sending the translation key.

In some implementations of the computing platform, the method may be performed by a plugin associated with the design application.

In some implementations of the computing platform, the original text may include a text field identifier and text field content. In some implementations of the computing platform, the translated user interface element includes a translated text field for may incorporate the translation output in the second language.

What is claimed is:

1. A system configured for enabling user interface text translation, the system comprising:

a non-transient computer-readable storage medium having executable instructions embodied thereon; and one or more hardware processors configured to execute the instructions to:

obtain, from a design application, original text associated with a user interface element, the original text being in a first language;

generate a translation key based on the original text associated with the user interface element;

send the translation key to a translation application;

receive, from the translation application, a translation output associated with the translation key, the translation output including translated text in a second language corresponding to the original text in the first language; and provide, to the design application, the translation output to automatically populate a translated user interface element in the second language related to the user interface element in the first language.

2. The system of claim 1, wherein the one or more hardware processors are further configured by the instructions to:

generate the translation key such that the translation key comprises the original text.

3. The system of claim 1, wherein the one or more hardware processors are further configured by the instructions to:

send, to the translation application, a common text indicator indicating a plurality of different user interface elements which comprise the original text identified by the translation key, for use in preventing duplicate translation of the original text for each of the plurality of different user interface elements.

4. The system of claim 1, wherein the one or more hardware processors are further configured by the instructions to:

send, to the design application, a command to modify a layer name associated with the user interface element such that the modified layer name comprises the translation key.

5. The system of claim 1, wherein the one or more hardware processors are further configured by the instructions to:

send, to the translation application, an indication of a plurality of translation languages;

receive, from the translation application, the translation output associated with the translation key, the translation output including translated text in the plurality of translation languages corresponding to the original text in the first language; and provide, to the design application, the translation output for use in creating a plurality of translated user interface elements in the plurality of translation languages related to the user interface element in the first language.

6. The system of claim 1, wherein the one or more hardware processors are further configured by the instructions to:

obtain, from the design application, original text associated with each of a plurality of user interface elements;

concurrently generate a plurality of translation keys based on the original text associated with the plurality of user interface elements;

send the plurality of translation keys to the translation application.

7. The system of claim 6, wherein the one or more hardware processors are further configured by the instructions to:

receive, from the translation application, translation outputs associated with each of the plurality of translation keys, the translation outputs each including translated text in a second language corresponding to the original text in the first language; and provide, to the design application, the translation outputs for use in creating a plurality of translated user interface elements in the second language related to the user interface element in the first language.

8. The system of claim 6, wherein the one or more hardware processors are further configured by the instructions to:

send, to the translation application, an indication of a plurality of translation languages;

receive, from the translation application, translation outputs associated with each of the plurality of translation keys, the translation outputs each including translated text in the plurality of translation languages corresponding to the original text in the first language; and provide, to the design application, the translation outputs for use in creating a plurality of translated user interface elements in the plurality of translation languages related to the user interface element in the first language.

9. A computer-implemented method for enabling user interface text translation, the method comprising:

obtaining, from a design application, original text associated with a user interface element, the original text being in a first language;

generating a translation key based on the original text associated with the user interface element;

sending the translation key to a translation application;

receiving, from the translation application, a translation output associated with the translation key, the translation output including translated text in a second language corresponding to the original text in the first language; and providing, to the design application, the translation output for use in creating to automatically populate a translated user interface element in the second language related to the user interface element in the first language.

10. The method of claim 9, further comprising:

generating the translation key such that the translation key comprises the original text.

11. The method of claim 9, further comprising:

sending, to the translation application, a common text indicator indicating a plurality of different user interface elements which comprise the original text identified by the translation key, for use in preventing duplicate translation of the original text for each of the plurality of different user interface elements.

12. The method of claim 9, further comprising:

sending, to the design application, a command to modify a layer name associated with the user interface element such that the modified layer name comprises the translation key.

13. The method of claim 9, further comprising:

sending, to the translation application, an indication of a plurality of translation languages;

receiving, from the translation application, the translation output associated with the translation key, the translation output including translated text in the plurality of translation languages corresponding to the original text in the first language; and providing, to the design application, the translation output for use in creating a plurality of translated user interface elements in the plurality of translation languages related to the user interface element in the first language.

14. The method of claim 9, further comprising:

obtaining, from the design application, original text associated with each of a plurality of user interface elements; and concurrently generating a plurality of translation keys based on the original text associated with the plurality of user interface elements; and sending the plurality of translation keys to the translation application.

15. The method of claim 14, further comprising:

receiving, from the translation application, translation outputs associated with each of the plurality of translation keys, the translation outputs each including translated text in a second language corresponding to the original text in the first language; and providing, to the design application, the translation outputs for use in creating a plurality of translated user interface elements in the second language related to the user interface element in the first language.

16. The method of claim 14, further comprising:

sending, to the translation application, an indication of a plurality of translation languages;

receiving, from the translation application, translation outputs associated with each of the plurality of translation keys, the translation outputs each including translated text in the plurality of translation languages corresponding to the original text in the first language; and providing, to the design application, the translation outputs for use in creating a plurality of translated user interface elements in the plurality of translation languages related to the user interface element in the first language.

17. A non-transient computer-readable storage medium having instructions embodied thereon, the instructions being executable by one or more processors to perform a method for enabling user interface text translation, the method comprising:

obtaining, from a design application, original text associated with a user interface element, the original text being in a first language;

generating a translation key based on the original text associated with the user interface element;

sending the translation key to a translation application;

receiving, from the translation application, a translation output associated with the translation key, the translation output including translated text in a second language corresponding to the original text in the first language; and providing, to the design application, the translation output to automatically populate a translated user interface element in the second language related to the user interface element in the first language.

18. The computer-readable storage medium of claim 17, wherein the method further comprises:

obtaining, from the design application, original text associated with each of a plurality of user interface elements; and concurrently generating a plurality of translation keys based on the original text associated with the plurality of user interface elements; and sending the plurality of translation keys to the translation application.

19. The computer-readable storage medium of claim 17, further comprising:

generating the translation key such that the translation key comprises the original text.

20. The computer-readable storage medium of claim 17, further comprising:

sending, to the design application, a command to modify a layer name associated with the user interface element such that the modified layer name comprises the translation key.

* * * * *